United States Patent [19]
Wilcox et al.

[11] Patent Number: 5,375,800
[45] Date of Patent: Dec. 27, 1994

[54] ERGOMETRIC COMBINATION ADJUSTABLE KEYBOARD SUPPORT STAND AND WRIST REST, PARTICULARLY FOR AVOIDANCE OF CARPAL TUNNEL SYNDROME

[75] Inventors: Katherine C. Wilcox, San Marcos; David Weston, Newport Beach, both of Calif.

[73] Assignee: Basic Needs, Inc., Escondido, Calif.

[21] Appl. No.: 110,411

[22] Filed: Aug. 20, 1993

[51] Int. Cl.$^5$ ............................................. F16M 13/00
[52] U.S. Cl. .................... 248/118.1; 248/918; 248/346; 400/715
[58] Field of Search .................. 248/118, 118.1, 118.3, 248/118.5, 346, 345.1, 918, 678; 400/718, 715; 132/73

[56] References Cited

U.S. PATENT DOCUMENTS

| | | | |
|---|---|---|---|
| 4,481,556 | 11/1984 | Berke et al. | 248/118 X |
| 4,635,893 | 1/1987 | Nelson | 400/718 X |
| 5,158,257 | 10/1992 | Wilson | 248/918 X |
| 5,209,452 | 5/1993 | Goldberg | 248/118 X |
| 5,219,136 | 6/1993 | Hassel et al. | 248/918 X |

FOREIGN PATENT DOCUMENTS

| | | | |
|---|---|---|---|
| 1913287 | 9/1970 | Germany | 400/715 |
| 2074948 | 11/1981 | United Kingdom | 400/715 |

OTHER PUBLICATIONS

IBM Corporation, *IBM Technical Disclosure Bulletin*, "Adjustable Terminal Table", vol. 28, No. 2, Jul. 1985, pp. 747–750.

*Primary Examiner*—Karen J. Chotkowski
*Attorney, Agent, or Firm*—William C. Fuess

[57] ABSTRACT

A keyboard is adjustably supported in an ergonomically neutral position relative to a typist's forearm, wrist and fingers nonetheless that the elevation, and attendant magnitude, of a support also provided to the typist's wrist is conveniently independently variably adjustable. The two adjustments increase comfort while reducing fatigue and repetitive motion injury, particularly carpal tunnel syndrome. A planar keyboard support member is variably supported at typically six (6) different angles from 0° to 15° by a support mechanism typically in the shape of a hinged arm engaging a selected channel, or groove. A padded wrist rest, normally hinged to the keyboard support, is independently adjustable to typically four (4) different elevations, preferably by use of an eccentric cam. The wrist rest preferably defines an interior cavity for holding pencils and other objects. A console for holding paper clips and like objects is selectively attachable to the keyboard support member, and is a copyholder for holding paper copy is in turn selectively attachable to the console.

16 Claims, 5 Drawing Sheets

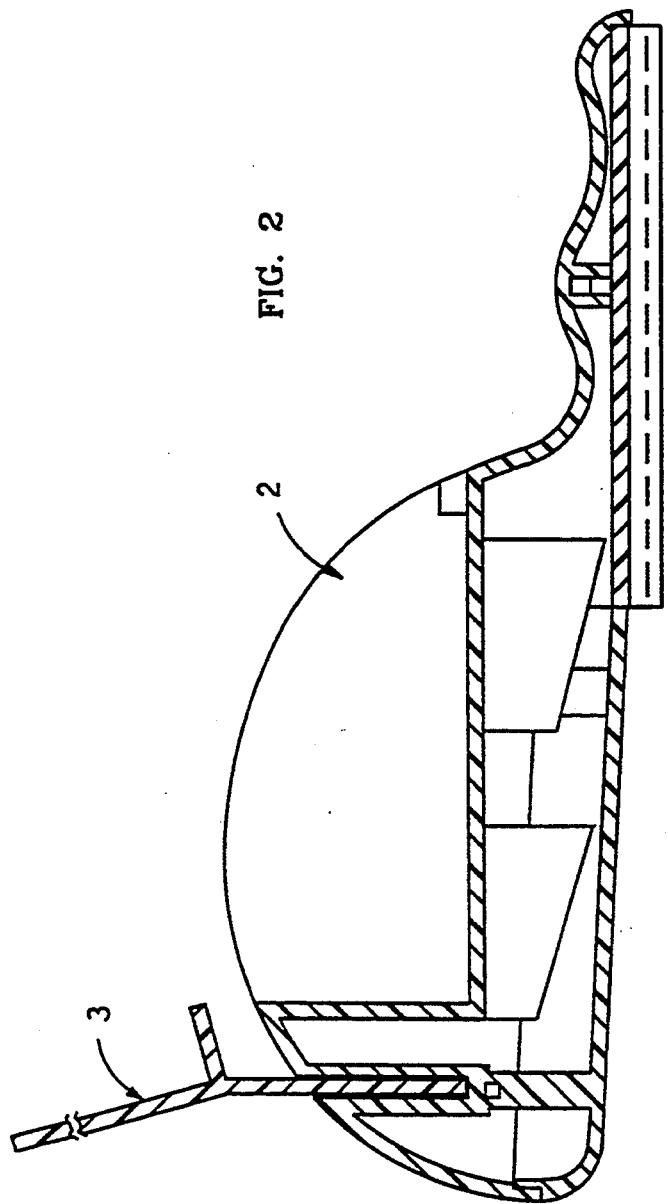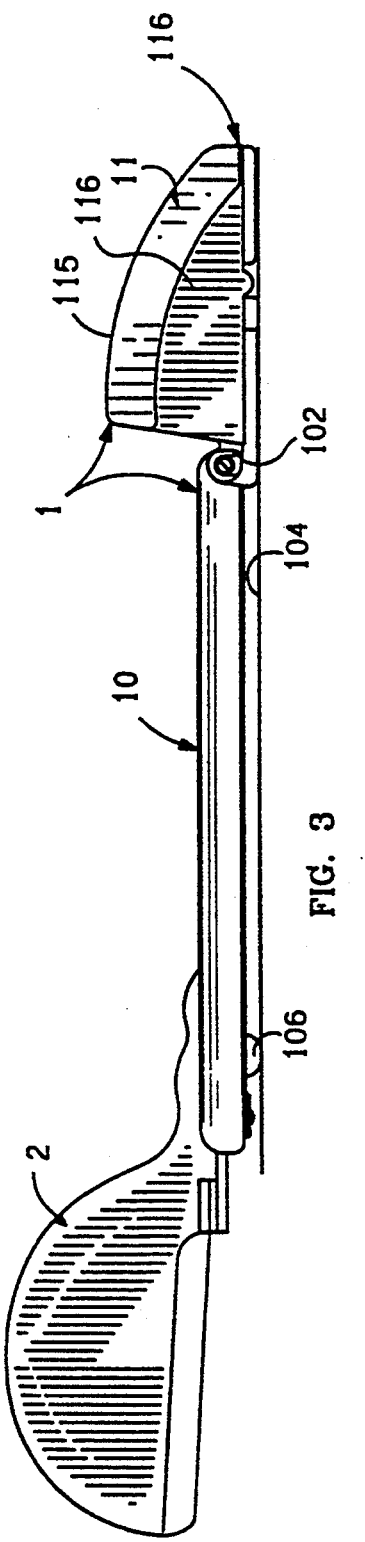

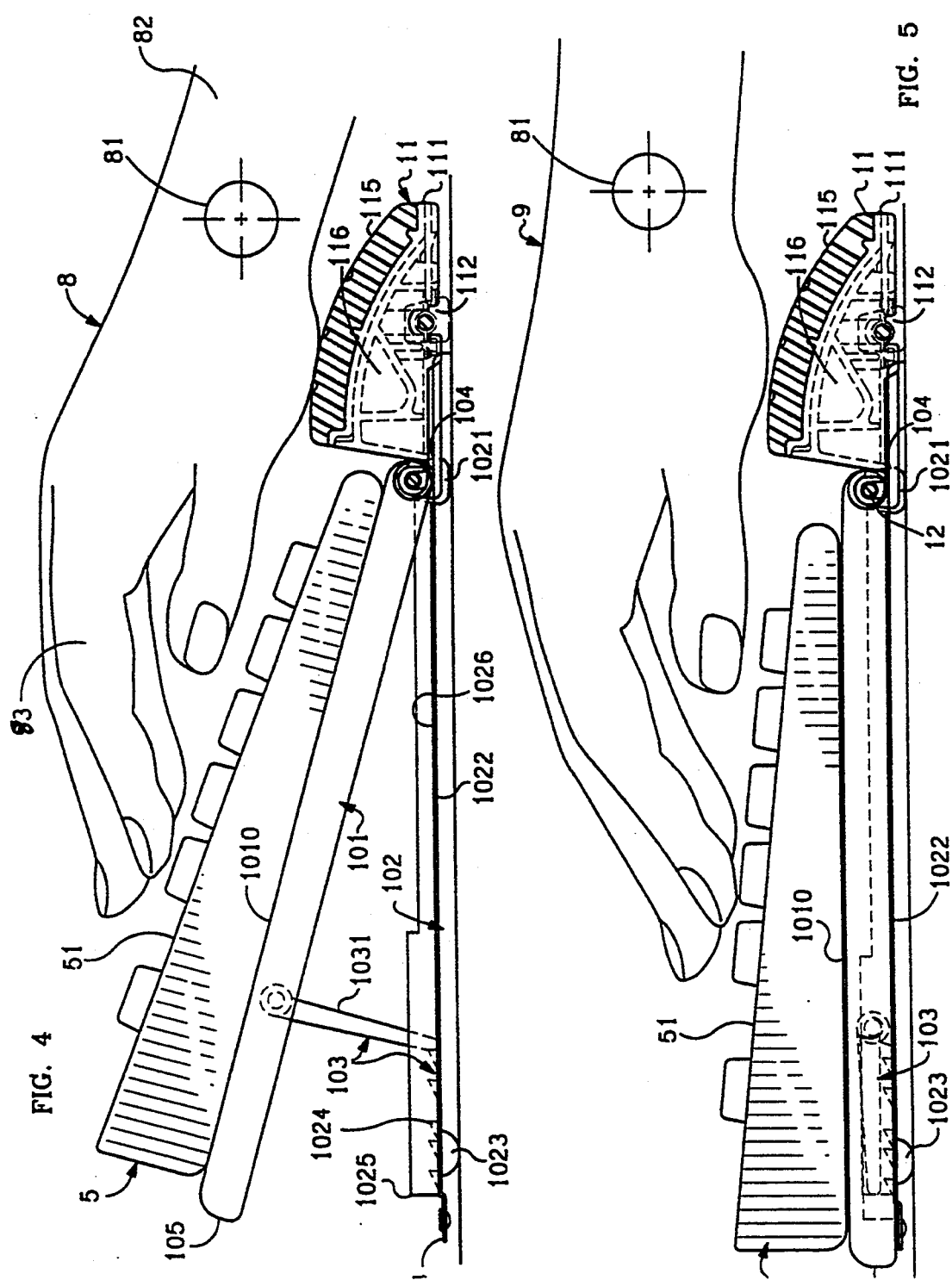

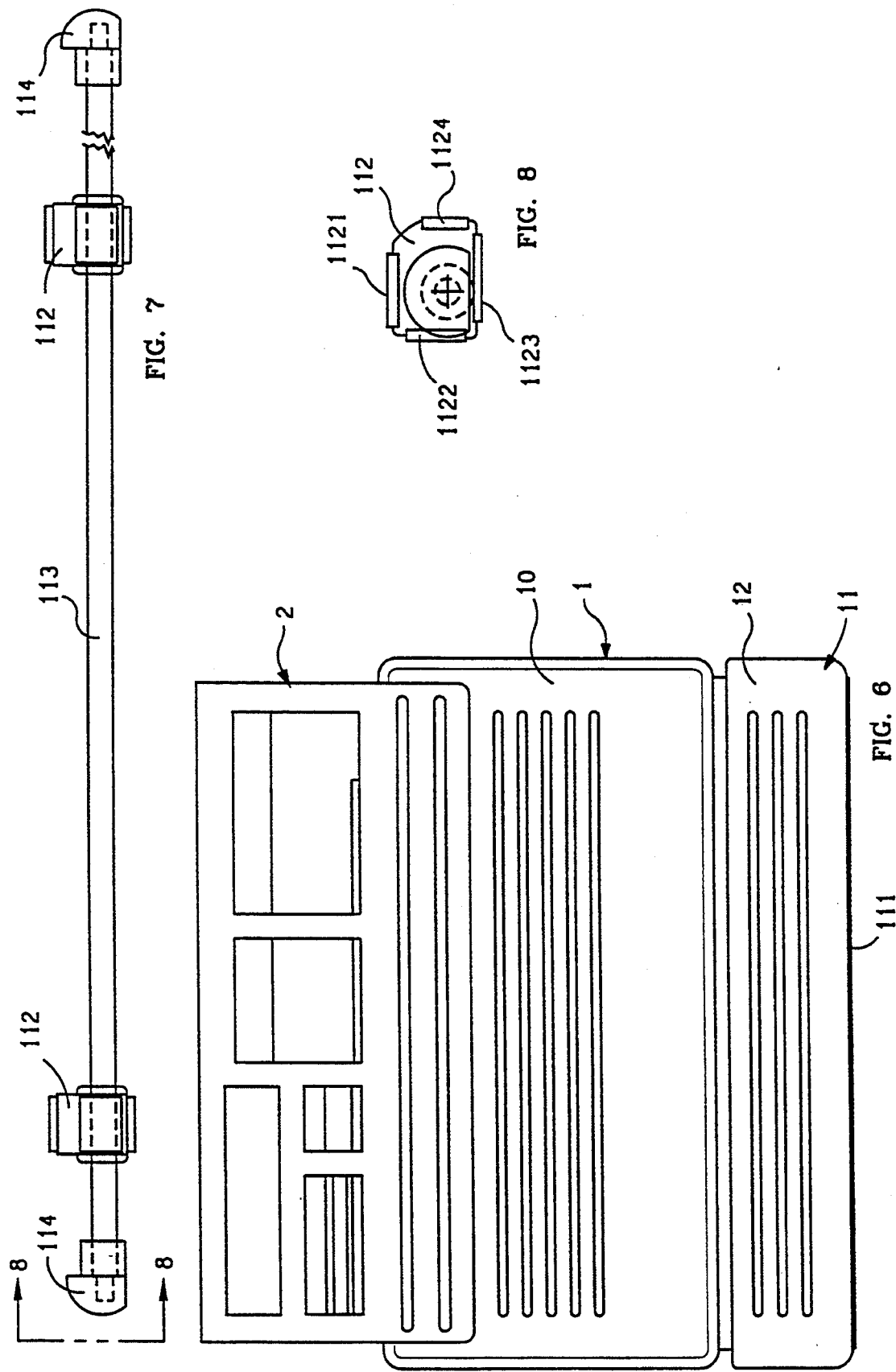

ERGOMETRIC COMBINATION ADJUSTABLE KEYBOARD SUPPORT STAND AND WRIST REST, PARTICULARLY FOR AVOIDANCE OF CARPAL TUNNEL SYNDROME

BACKGROUND OF THE INVENTION

1. Field of the Invention

The present invention concerns furniture and accessories for use with computer data entry devices, particularly keyboards, in order that repetitive motion injuries to typists, and particularly carpal tunnel syndrome, may be avoided.

2. Description of the Prior Art

Discussion within the present section is drawn in substantial part from the Dec. 1, 1991, study report "*An experimental test of a design prototype of the Protex TM system*" by Alan Hedge and James R. Powers of the Human Factors Research Laboratory, Department of Design and Environmental Analysis, Cornell University, Ithaca, N.Y. 14853.

An anticipated increase in white-collar productivity through widespread computerization has failed to materialize. Part of the reason for this may be because when (i) computer monitors are viewed for long periods of time, and/or (ii) computer entry devices —primarily keyboards and mice—are used incorrectly, then these devices can become a source of physical stress and even injury. Stress diminishes productivity. Employee aversion to computers, even if subconscious, ultimately diminishes the effectiveness of the computers in the work place, and erodes business profitability through losses in employee productivity. Computer-induced injuries can result in absenteeism, and increases in health care costs.

As an example of a computer work place problem (although not the particular problem dealt with by the present invention), the notorious "QWERTY" keyboard layout was originally developed to intentionally reduce typing speed in order to avoid mechanical jamming of a manual typewriter. The "QWERTY" keyboard layout is grossly inefficient for data entry.

Perhaps equally as importantly, typewriter keyboards were originally positively sloped for reasons of mechanical design, and in order to accommodate the mechanical linkages between the rows of keys and the keybars. Computer keyboards continue this tradition, and are usually positively sloped if only so as to permit inexperienced users to see letters and key positions. By comparison, few other activities involving the hands and fingers—such as engraving, or the soldering of components on printed circuit boards—are regularly conducted on an inclined surface. Accordingly, several vestiges of typewriter design persist in the modern computer keyboard.

The two features of (i) keyboard layout and (ii) keyboard spatial attitudinal position that were once essential for the design of the mechanical typewriter now appear to play a significant negative role in the growing epidemic of musculo-skeletal problems among computer keyboard users. Foremost among these musculoskeletal problems is carpal tunnel syndrome.

Carpal tunnel syndrome (CTS) is a cumulative trauma disorder (CTD) of the hand and wrist. It is believed to be caused primarily by the way in which work using the hands and wrists, including typing, is performed. In other words, it is an induced injury. A cumulative trauma disorder results from accumulated minor injuries to the musculo-skeletal system caused by the physical stresses of performing work over a prolonged period. Eventually the affected worker experiences pain, restricted mobility of the affected joint(s) and limbs, and soft tissue swelling. Reference Putz-Anderson, V. (1988) *Cumulative Trauma Disorders: A manual for musculo-skeletal disorders of the upper limbs*, (New York: Taylor & Francis).

According to the U.S. Bureau of Labor Statistics, compensable CTD cases increased from 20,000 in 1981 to 146,900 in 1989, and now account for 52% of all compensable work place injuries. Of these CTD cases, 125,000 were cases of compensable CTS. The incidence of CTS is increasing at an alarming rate, particularly among computer users. Although CTS can be treated with surgery, studies from Australia show that over half of the affected workers will suffer repeat occurrences of CTS within 1-2 years of returning to their job if nothing else is changed. Understanding the causes of CTS and redesigning the job to minimize or eliminate these causes is the best means of preventing and resolving CTS problems.

All finger movements involve the use of tendons. Tendons connect muscle to bone. When a muscle contracts the force is transferred to the appropriate bone via the tendons, which causes the bone to move (like pulling on the strings of a puppet). Each tendon in the hand and wrist is surrounded by a sheath (a tendon sheath) which secretes a lubricating fluid (synovial fluid) to minimize frictional forces as the fingers are flexed and extended (the tendon slides inside the tendon sheath). Movements of the fingers result from movements of tendons attached to the muscles of the forearm. When muscles in the upper forearm contract, the tendons that open (extend) the fingers contract, and as contraction continues the hand is pulled backwards (extension). When the muscles in the lower forearm contract the tendons that close (flex) the fingers contract, and if this continues the whole hand bends downwards (flexion). Tendon movement from full flexion to full extension can be as much as five centimeters (5 cm).

CTS is caused by cumulative damage to the finger tendons as they pass through a two to three centimeter (2-3 cm) long, narrow, rigid channel in the wrist—the carpal tunnel. With the hand oriented palm down, the roof of the carpal tunnel is formed by the arch of the carpal bones and the floor by the tough transverse carpal ligament. The carpal tunnel contains the tendons for the fingers, the radial artery, and the median nerve which transmits sensation for the thumb and the first 2.5 fingers. Sensation for the remaining 1.5 digits is transmitted via the ulnar nerve which runs outside of the carpal tunnel.

As the hand deviates from normal either (i) horizontally either towards the thumb (radial deviation) or towards the little finger (ulnar deviation), or (ii) vertically up or down, the pressure on the carpal tunnel increases. Vertical deviations (extension/flexion) create significant increases in carpal tunnel pressure. Reference Armstrong, T., Castelli, W. A., Evans, F. G. & Perez, R. D. (1984) *Some histological changes in carpal tunnel contents and their biomechanical implications*, Journal of Occupational Medicine, 26 (3), 197–201.

Accelerations from extension to flexion are thought to pose the greatest risk for CTS. Reference Marras, W. S. & Schoenmarklin, R. W. (1991) *Wrist motions and CTD risk in industrial and service environments*, in Y.

Queinnic & F. Daniellou et. al., (eds.) *Designing for Everyone: Proceedings of the Eleventh Congress of the International Ergonomics Association*, Vol. 1, New York, Taylor & Francis, pp. 36–38.

When the hand is in a wrist neutral position (i.e., no vertical or horizontal deviation) then there is minimum pressure on the tendons and the median nerve in the carpal tunnel.

With occupational overuse of the fingers, minor trauma to the tendons and the sheaths may accumulate and eventually produce CTS. Repetitive movements with the hands in a deviated posture accelerate the onset of CTS. Reference Chaffin, D. B. & Anderson, G. (1984) *Occupational Biomechanics*, (New York: John Wiley & Sons).

As the tendons or their sheaths become irritated and inflamed, the resulting swelling increases the pressure on the median nerve, which initially causes tingling, then numbness, and eventually disabling pain when the fingers are moved. Computer users are particularly at risk because of the large number of finger movements which the fingers may make in a short time. For example, a data entry worker who averages 13,000 key strokes per hour will make over half-a-million finger movements per week. In short, the three major risk factors for CTS are poor posture, pressure in the carpal tunnel, and lack of pauses to allow time for tissue repair.

The use of QWERTY keyboard layout, which can cause some ulnar deviation of both hands, and a positive keyboard angle which places the hands in an extended posture, combine to increase the risks of CTS. Over time these factors accelerate the accumulation of trauma to the hands/wrists, and this cumulative trauma is now appearing as the epidemic of CTS cases. Also, QWERTY keyboards usually are asymmetrical (i.e., the numeric keyboard is to the right of the QWERTY keys) and users tend to center the keyboard on their screen rather than centering QWERTY on the screen. This can result in users sitting in twisted postures which increase the risks of back, shoulder and neck problems.

Accordingly, and in recapitulation, the major contributing factors to the occurrence of CTS are believed to fall primarily within the categories of (i) poor posture, (ii) no or insufficient pauses during work, and (iii) undesirable pressures. "Poor posture" includes (i) wrist extension, (ii) hand deviation, and (iii) poor seated posture. "No or insufficient pauses" include (i) repetitive movements, (ii) no or inadequate micro-breaks, and (iii) impaired tissue repair. "Undesirable pressures" include those pressures resultant from (i) flexion/extension accelerations, (ii) increased carpal tunnel pressure, and (iii) increased tissue trauma.

Because of the significance of the CTS problem, a number of previous products have attempted to reduce CTS risks.

First, the layout of data entry keyboards have been modified. Keyboard re-designs to minimize horizontal radial or ulnar deviation have been developed. Reference Grandjean, E. (1988), *The Ergonomics of Computerized Offices*, (New York: Taylor & Francis); also Grandjean, E. (1988), *Fitting the Task to the Man*, 4th ed. (New York: Taylor & Francis). However, the problem of vertical deviation (extension) remains even with these keyboards. Also, postural risks from using other input devices (e.g., mouse) are obviously unaffected by modification to keyboard layout.

Second, wrist rests have been provided. Each arm weighs about 2.5% of a human's total body weight. The ability to rest the wrists on a support helps to reduce muscular activity in the forearm and incidentally reduce pressure in the carpal tunnel. However, problems of flexion/extension and ulnar/radial deviation remain because of the design and slope of the keyboard. Reference Parsons, C. A. (1991), *"Use of wrist rest by data input VDU operators"* appearing in *Contemporary Ergonomics 1991—Proceedings of the Ergonomics Society's 1991 Annual Conference*, (London, Taylor & Francis) pp. 319–321. Parsons tested nine different wrist rests on forty full time data input VDU operators. None of the operators found them useful, and 10% commented that discomfort increased when using a wrist rest with a traditional keyboard.

Third, full motion fore-arm supports have been provided. These products provide full motion fore-arm support for the worker. Each arm is rested in a mobile support which takes the arm weight for all horizontal movements. However, as with wrist rests, problems of flexion/extension and ulnar/radial deviation remain because of the design and angle of the keyboard, and in a short-term test the use of full motion fore-arm supports resulted in a slight slowing of typing speed. Reference Powers, J. R. (1991), *"Effects of full-motion fore-arm supports on keyboard operator hand-wrist posture, keyboarding performance, and keyboarding accuracy"*, Master's Thesis, Dept. Design & Environmental Analysis, Cornell University.

One existing, extensive, composite, and sophisticated system for avoidance or alleviation of CTS is the Protex ™ System available from Proformix, Inc. Whitehouse Station, New Jersey. (Protex ™ is a trademark of Proformix, Inc.) Unlike keyboards which are angled on a positive incline, or keyboard trays which are horizontal surfaces that hold the keyboard at a positive angle to the body, the Protex ™ System supports and presents the keyboard at an angle ranging from zero degrees (0°, or level) to various angular slopes downwards and away from the worker. The result of flattening the keyboard angle, or sloping the keyboard away from the worker, is that the fingers operate the keys with the hands permanently in a vertically wrist-neutral position. This re-orienting of the keyboard, combined with the use of a broad wrist-support to reduce muscular activity associated with unsupported forearms, is intended to significantly reduce the risk of RSI. Indeed, in Australian field tests of this type of design, Stack (1987, 1988) reports that slanting the keyboard away from the operator so as to flatten the angle of the wrists and fingers was a major factor in solving the problems of RSI in the Tasmanian public service. Reference Stack, B. (1987), *Keyboard RSI: the practical solution*, Meuden Press, Hobart. Reference also Stack, B. (1988) papers in press cited by Patkin, M. in *"Neck and arm pain in office workers: causes and management"*, appearing in Sauter, S. L., Dainoff, M. J. & Smith, M. J. (eds.) *Promoting health and productivity in the computerized office: models of successful ergonomic interventions*, Chap. 13, (Taylor & Francis, New York), pp. 207–231, 1990.

Experiments at Cornell University with the Protex ™ System have reportedly shown that a negative slope keyboard significantly reduces wrist extension and places the hand in a vertically wrist neutral position. Reference *"An experimental test of a design prototype of the Protex ™ system"* by Alan Hedge and James R. Powers of the Human Factors Research Laboratory, Department of Design and Environmental Analysis, Cornell University, Ithaca, N.Y. 14853. This finding is in agreement with that of the Australian research. Reference Stack (1987, 1988), op cit. Subjects using the negatively sloped keyboard support sat 11 cm farther from the VDT screen, but the viewing distance remained within the preferred range of distances 61-93 cm. Reference Grandjean, E. (1988) *Fitting the Task to the Man,* 4th ed., (New York: Taylor & Francis).

The ulnar deviation of both hands was comparable in both conditions. Research showed that ulnar deviation varies between ten to twelve degrees (10°-12°) for the right hand even when subjects are working with a split keyboard with an opening angle of twenty-five degrees (25°) and a ten degrees (10°) sloping fore-arm support. Reference Grandjean, E. (1988), op cit. The ulnar deviation of thirteen degrees (13°) for the right hand that was found in this study is comparable with results reported by Grandjean, and this suggests that even a redesigned split keyboard does not dramatically change ulnar deviation. Some ulnar deviation seems inevitable with keyboard use, and this is not thought to be a major CTS risk factor.

Several additional products are commercially available that can place a keyboard at a negative angle, such as the Details TM keyboard support (Details TM is a trademark of Steelcase, Inc.) and the Flex-Rest TM keyboard support (Flex-Rest TM is a trademark of Flex-Rest, Inc.). However, these products are more difficult to adjust, do not provide comparable wrist neutral support, do not support mouse work or pen-based work. Additionally, products are metal framed and they do not necessarily reduce risks from electromagnetic fields (EMF).

The present invention will be seen to accommodate the realities of existing office furniture, and the existing organization of keyboarding stations. A great deal of existing office furniture—which furniture normally presents a level surface for supporting a keyboard at or near the ergonomic standard height (for Americans, circa 1993) of twenty-eight and one-half inches (28.5")—cannot reasonably nor economically be discarded. Moreover, multitudinous existing computer keyboards make no accommodation to being oriented at a negative angle.

The present invention will be seen to be directed to doing the best that can reasonably be done towards ergonomically accommodating individuals of considerably different sizes (ranging from a 5th percentile female to a 95th percentile male) in their use of an existing computer keyboard placed upon an existing surface (which surface is typically not adjustable in height).

In so doing, and so accommodating, a first challenge to ergonomic design is the considerably different angles of approach to a keyboard surface resting upon an ergonomic standard twenty-eight and one-half inches (28.5") high desk made by the fingers and forearms of a 5th percentile female versus a 95th percentile male. When seated upon a standard chair, a 95th percentile male typically enjoys an ergonomically-correct straight wrist-hand angle in the placement of his fingers atop a keyboard surface that rests upon an ergonomic standard twenty-eight and one-half inches (28.5") high desk. However, when seated upon the same standard chair, a 5th percentile female's forearms will approach the keyboard from an extreme, twenty-five degree (25°), down angle, and she must bend her wrists and fingers in considerable flexion. Most keyboard typists in the American work force circa 1993 are female. Curiously, and nonetheless, the American office furniture that is most commonly used by females is better ergonomically designed—at least in its support of computer keyboards—for use by males!

According to this first ergonomic challenge, it would be useful if some improvement—consistent with existing conditions of the office work place environment—could be made so as to permit a better angle of approach of the wrists and hands of variously sized or variously seated typists to a pre-existing computer keyboard.

Another ergonomic challenge is stress relief, and fatigue avoidance. Again, any realistic solution is likely to be constrained by the existing conditions of the office work place environment. However, it would be useful if an ergonomic device could make some flexible, and realistic, accommodation to relieving strain on a typist's forearms, wrists and/or hands by improving support of the typist's wrists. Reference Parsons (1991) and Powers (1991), op cit.

SUMMARY OF THE INVENTION

The present invention contemplates a combination wrist rest and keyboard support stand by which (i) a keyboard may be adjustably supported in an ergonomically neutral angular position relative to a typist's forearms, wrists and fingers at the same time, and nonetheless, that (ii) the elevation, and attendant magnitude, of a support also provided to the typist's wrists is conveniently independently variably adjustable in order to increase the typist's comfort and to reduce his/her fatigue.

A combination wrist rest and keyboard support stand in accordance with the present invention adjustably separately supports both (i) a typist's wrists and (ii) a keyboard in positions above existing and conventional surfaces. Such surfaces are provided, for example, by the level tops of desks or computer work stations. The surfaces may be of various absolute heights, and of various heights relative to typists who may be variously seated and who range in size from a 5th percentile female to a 95th percentile male.

The keyboard support provided by the invention is manually adjustable so as to position the base of a keyboard at angles from zero degrees, (0°, or level) to positive fifteen degrees (15°). At a standard working surface height of about twenty-eight and one-half inches (28.5"), this angular adjustment is sufficient to establish a ergonomically neutral, or straight, angle between the forearm and the wrist and the fingers of over ninety percent (90%) of typists when such typists are seated at the height of a standard chair. This ergonomically correct angle, alone and without more, (i) increases typist productivity by enhancing comfort, and (ii) reduces typist fatigue and repetitive motion injury, particularly carpal tunnel syndrome, through proper positioning of the typist's joints, tendons and muscles.

In accordance with the present invention, a support for the typist's wrists is also provided. The wrist rest is operatively connected to the keyboard support stand by a hinge. Despite its hinged connection to the keyboard support stand, the wrist rest is adjustable in elevation relative to the keyboard support stand, and relative to the keyboard held thereon, independently of the angular adjustment of the keyboard support stand.

Moreover, the elevation adjustment of the wrist rest is normally both readily and quickly accomplished under slight force of the fingers. The wrist support is adjustable not only so as to ergonomically support the wrists of different typists that approach the keyboard as it is held at various appropriate angles but also, and importantly, so as to provide a support to any individual typist's wrists that varies, over time, in both (i) magnitude, and (ii) location. Indeed, the ergonomic "correctness" of the support provided to the typist's wrists is, within limits, not so much a matter of where and how strongly the support is provided but that, mercifully to the typist, the support force may be varied, may easily be varied, and may be varied in both its (i) magnitude and (ii) location. Indeed, both the (i) magnitude and/or (ii) location of the wrist support are intended to be frequently varied so as to best avoid the stress and injury that potentially results from constant repetitive motion from a fixed position, and so as to continually support the typist's wrists for optimum comfort and productivity.

Accordingly, a combination wrist rest and keyboard support stand in accordance with the present invention is not simply directed to inflexibly permanently supporting a keyboard and a typist's wrist at a predetermined position, nor even at an adjustably predetermined position—howsoever ergonomically optimal. Instead, the combination wrist rest and keyboard support stand in accordance with the present invention is characterized in that both (i) keyboard angle and (ii) wrist support are readily, conveniently and independently adjustable over broad ranges in minute increments.

During use of a combination wrist rest and keyboard support stand in accordance with the present invention, a typist quite naturally, and without formal instruction, soon learns that his/her response to strain or fatigue need not, and should not, be to simply to shake his/her hands and wrists and to recommence keystroking (howsoever ergonomically correctly positioned therefore-)—as was common in the past. Instead, a typist readily and naturally learns to quickly and conveniently adjust (i) the keyboard angle and/or, independently, (ii) the wrist rest in order that stress and stain may best be avoided. In naturally doing what feels best the typist naturally avoids the unvarying repetition that is the harbinger of repetitive motion injuries, and particularly of carpal tunnel syndrome.

One, preferred, embodiment the combination wrist rest and keyboard support stand in accordance with the present invention includes a wrist rest member—adjustable in elevation above a surface upon which it rests—for supporting a human wrist. A keyboard support member that supports a keyboard on its upper surface is connected, preferably by a pivoting hinged connection, to the wrist rest member. The keyboard support member, and the keyboard supported thereon, is adjustable in angle relative to level substantially independently of the elevation adjustment of the wrist rest member to which it connects. Two things (the keyboard support and the wrist rest) that are adjustable (respectively in angle, and in elevation) relative to a third thing (the level surface) are, by the rules of mechanics, adjustable relative to each other. Accordingly, by this structure a typist's wrist that is supported on the wrist rest member may be variably adjusted in both elevation and in angle relative to a keyboard that is supported on the keyboard support member.

The wrist rest member preferably has and presents an upper surface, normally a heavily padded surface, which is curved along an imaginary axis substantially spaced parallel to a long axis of the keyboard (as such keyboard is supported by the keyboard support member). The typist's wrist is supported along a line of tangential contact between his/her wrist and the padded upper surface of the wrist rest. By this geometry the line of contact of the typist's supported wrists with the upper surface of the wrist rest will vary so as to be in greater, or in lessor, proximity to the keyboard which is supported upon the keyboard support member dependent upon whether the keyboard support member is elevated respectively to a greater, or to a lessor, extent. This relationship is useful. It means that an adjustment in elevation of the wrist rest member also serves to cause it to contact the typist's wrist (in order to support the wrist) at various positions along the wrist, and at greater or lessor proximity to the keyboard. Because the wrist is contacted in different spots, a constant pressure undesirably occurring in the same location is avoided.

The wrist rest member is preferably adjusted in height by a pivoting interconnection of an asymmetrical member eccentrically mounted to a pivot joint at its underside. The eccentric member is manually adjustable, normally by force of the fingers, so as to pivot about the pivot joint in order to adjustably elevate the wrist rest member to various elevations above the surface, normally a desk or table top, upon which it is itself supported.

Meanwhile, the keyboard support member is preferably made from two, and upper and a lower, substantially planar substantially rectangular members. The upper and lower members are hinged together along one long edge by the same, major, hinge joint that serves to pivotally connect the keyboard stand to the wrist rest. The upper and lower members are adjusted to varying degrees of angular separation about the hinge joint by action of one or more, and preferably two, substantially planar substantially rectangular hinged plates that are located between the bottom surface of the upper member and the top surface of the lower member. Each hinged plate pivots about a minor hinge joint that is substantially parallel to the major hinge joint, and that is located either on the topside of the lower member, or the bottom side of the upper member, at a spaced parallel separation from the major hinge joint. The minor hinge joints are preferably located at the bottom side of the upper member. At various pivot angles a butt end edge of each hinged plate engages, and is retained within, complimentary features—normally in the shape of elongate parallel grooves, or channels, collectively having a sawtooth cross section—located in the opposed surface of the other member. When the plates are hinged about hinge joints that are within the bottom side of the upper member then the sawtooth grooves are in, and at, the upper surface of the lower member.

The butt end of each hinged plate is variously selectively manually positioned so as to engage one of the features, or one of the parallel grooves, upon the top surface of the lower member. The hinged plate then serves to support the upper member of the keyboard support member, and any keyboard resting thereon, at a variable angle relative to the wrist rest. Dependent upon which of the parallel grooves is engaged the angular position of the keyboard support member's upper surface, and any keyboard resting thereon, may be adjusted relative to level, and relative to the wrist rest, over some six (6) different discrete angles over a range of zero degrees (0°) to fifteen degrees (15°).

Further in accordance with the present invention, the wrist rest preferably has and defines an interior cavity for holding objects, normally pens, pencils, paper clips, rubber bands and like objects.

Still further in accordance with the present invention, a console is optionally attachable to the keyboard support member along its major edge opposite to the hinged attachment of the wrist rest member. The optional console holds objects such as paper clips and the like without interfering with the support functions of either the wrist rest member or the keyboard support member, and without interfering with the typist's use of his/her wrist and fingers in typing upon the supported keyboard.

Still further in accordance with the present invention, a copyholder is optionally attachable to the optional console and/or to the keyboard support stand, and extends upwardly therefrom. The copyholder holds a paper copy at a position visible to the typist whose wrists are supported upon the wrist rest member, and whose fingers keystroke the keyboard that is held upon the keyboard support stand.

These and other aspects and attributes of the present invention will become increasingly clear upon reference to the following drawings and accompanying specification.

BRIEF DESCRIPTION OF THE DRAWINGS

FIG. 2 is a cross-sectional view at an expanded scale, taken along aspect line 2—2 shown in FIG. 1, showing the optional console to the combination wrist rest and keyboard support stand in accordance with the present invention (which optional console was previously seen in FIG. 1) and, also, an optional copyholder mounted to the console.

FIG. 3 is a cross-sectional view, taken along aspect line 3—3 shown in FIG. 1, of the combination wrist rest and keyboard support stand in accordance with the present invention with its optional console attached, both of which combination wrist rest and keyboard stand, and console, were previously seen in FIG. 1.

FIG. 4 is a diagrammatic representation of the support, adjustable in both its area of contact and in its magnitude, provided to the wrist of a typical male or female whose average hand approaches at 25° a keyboard surface adjustably elevated to 15° by yet another adjustment of a combination wrist rest and keyboard support stand in accordance with the present invention.

FIG. 5 is a diagrammatic representation of the support, adjustable in both its area of contact and in its magnitude, provided to the wrist of a typical male or female whose average hand approaches at 0° a keyboard surface adjustably elevated to 0° by yet another adjustment of the combination wrist rest and keyboard support stand in accordance with the present invention.

FIG. 6 is a top plan view of the preferred embodiment of a combination wrist rest and keyboard support stand in accordance with the present invention with its optional attachable console mounted, both of which combination rest and stand, and console, were previously seen in FIG. 1.

FIG. 7 is a side plan view of the long axis of the adjustable eccentric cam that serves to adjust the elevation of the wrist rest of the combination wrist rest and keyboard support stand in accordance with the present invention.

FIG. 8 is an end view, taken along aspect line 8—8 shown in FIG. 7, of the adjustable eccentric cam that serves to adjust the elevation of the wrist rest of the combination wrist rest and keyboard support stand in accordance with the present invention.

DESCRIPTION OF THE PREFERRED EMBODIMENT

The present invention is embodied in (i) a manually adjustable keyboard support stand that serves to support a keyboard at an ergonomically correct angle relative to a typist's hands, in integral combination with (ii) a manually adjustable and, from time to time, manually variable, wrist rest that is connected to the keyboard stand and that serves to variably support, at different times, the typist's wrist at multiple different ergonomically correct locations relative to the keyboard that is supported upon the keyboard support stand.

An ergonomically correct keyboard support is realized for a broad size range of typists, and for a broad range of different types, heights and aspect rations of the furniture upon which the typist sets and/or the combination wrist rest and keyboard support stand rests, because the keyboard support stand is angularly adjustable to support a keyboard over a commensurately broad range of angles. The ergonomic correctness of the wrist support provided by the wrist rest is not only a function of the innate adjustability of the wrist rest, but, also, of the ready and simple adjustability and re-adjustability of the wrist rest. The combination of adjustments, and the facilitation of easy periodic re-adjustments, are jointly directed to increasing typist productivity while reducing fatigue and injury, particularly repetitive motion injury and more particularly carpal tunnel syndrome.

The combination keyboard stand and wrist rest preferably incorporates certain additional features such as, for example, a cavities for containing pencils or the like contained within the wrist rest. The combination keyboard stand and wrist rest may, optionally, be further connected to (i) a console, which is, in turn, optionally connected to (ii) a copyholder. A complete keystroking computer work station based on the combination keyboard stand and wrist rest with its optional console and copyholder in accordance with the invention promotes neat and efficient desk top organization, and good work station esthetics, as well as ergonomically correct typist posture and typist arm/wrist/hand alignment and positioning.

Figure 1:
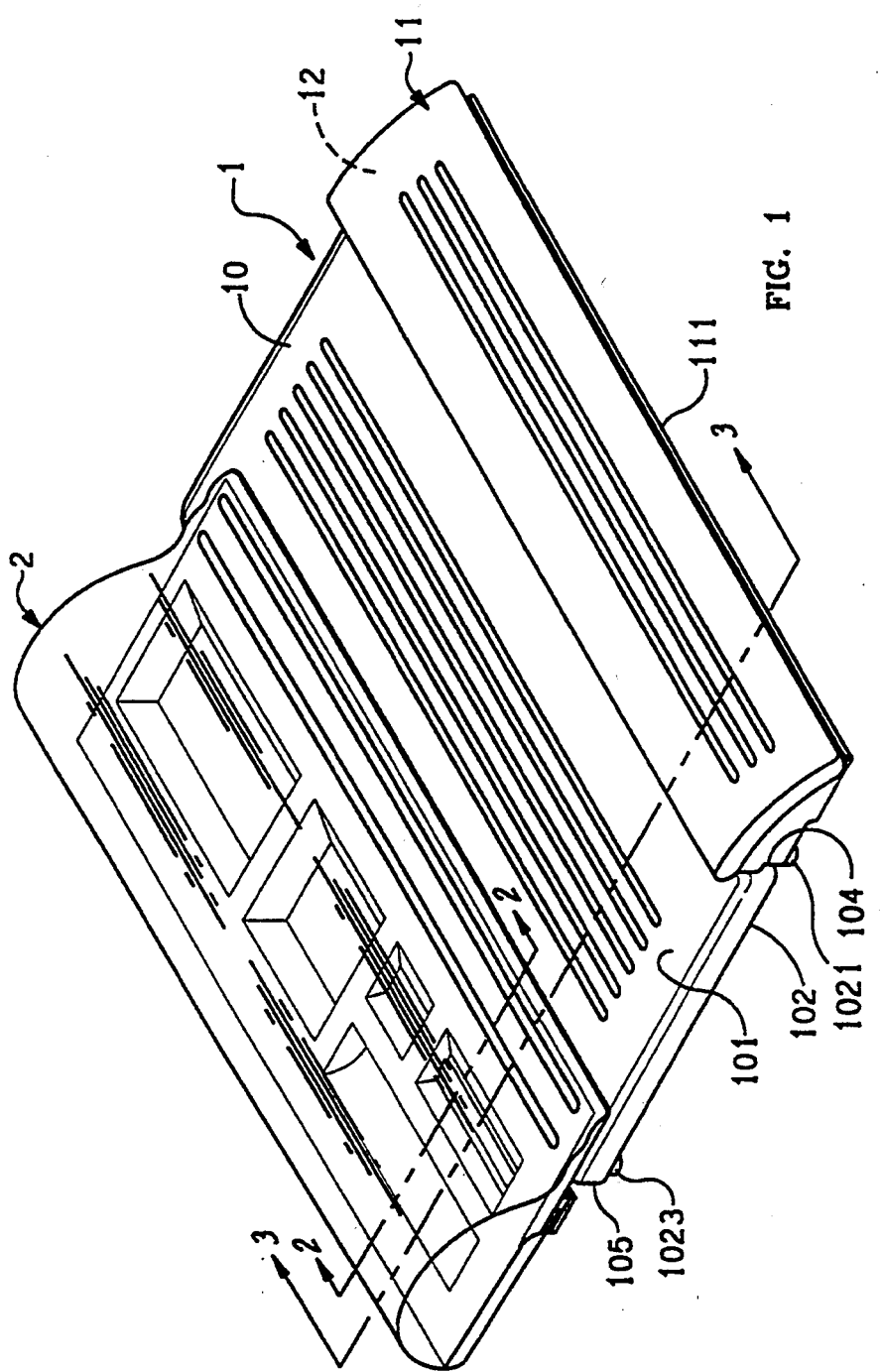
FIG. 1 is a perspective view showing the preferred embodiment of a combination wrist rest and keyboard support stand in accordance with the present invention with its optional attachable console mounted.

A perspective view of a preferred embodiment of a combination keyboard support stand and wrist rest 1 in accordance with the present invention is shown in FIG. 1. The keyboard support stand 10 is hinged to the wrist rest 11 by a hinge joint 12. An optional console 2 is shown mounted to the keyboard support stand 10. A cross-sectional view at an enlarged scale, taken along aspect line 2—2 shown in FIG. 1, of the console 2 is shown in FIG. 2. Also shown in FIG. 2, the combination keyboard support stand and wrist rest 1 may optionally have yet another (indirectly) attached member, a copyholder 3 that is attached to the console 2.

The combination wrist rest and keyboard support stand 1 proper as is shown in FIG. 1 consists of only two major subassemblies: a keyboard support member 10 which is connected to a wrist rest 11, preferably by a hinge joint 12 (best seen in FIGS. 4 and 5).

All parts of the combination wrist rest and keyboard support stand 1 are normally made from molded plastic, preferably ABS plastic in an industry-standard IBM ® white color. (IBM is a registered trademark of International Business Machines, Inc.). The wall thicknesses of all members vary as structural requirements dictate. The corner and fillet radii shown sharp in the Figures are 0.01 rad. or equivalent chamfer. Angular accuracies are normally within one degree ($\pm 1°$). The exterior surfaces are normally finished to mold technology specification MT 1013. The interior finish is normally to 600 stone, preferably to specification SPI-C1. Exterior surfaces are, as is consistent with quality and good workmanship, free from sink marks, ejector pin marks, and/or blemishes.

The keyboard support member 10 consists of a substantially planar substantially rectangular upper member 101 and an equivalent lower member 102 hinged to each other about the same hinge joint 12 that is otherwise used to hinge the keyboard support member 10 itself to the wrist rest 11. The upper member 101 and lower member 102 are urged to a variable degree of angular separation by an adjustable spacing and support mechanism 103 (all best seen in FIGS. 4 and 5). The keyboard support member 10 is supported along its hinged front edge 104 (which edge is closest to a typist the hands 8, 9 of which are shown in FIGS. 4 and 5, and closest to wrist rest 11) on typically three non-slip feet 1021. The feet 1021 are normally integrally attached and equidistantly spaced along the length of the lower member 102 at its underside surface 1022. Located proximately to the rear of the lower member 102, and also at its underside surface 1022, are further feet 1023. All the feet 1021, 1023 are typically made of either plastic or non-slip synthetic rubber pads.

The lower member 102 further presents a number of retaining features, normally four (4) parallel grooves, or channels, 1024 plus a back lip 1025 at its topside surface 1026. The lower member 102 of the keyboard support stand 10 is typically made of sheet metal, normally steel.

The keyboard support member 10 further presents—in a position proximate to its back edge 105 (which edge is most distant from a typist the hands 8, 9 of which are shown in FIGS. 4 and 5, and furthest from the wrist rest 11)—an internal, variably adjustable, adjustable spacing and support mechanism 103. The spacing support mechanism 103 consists of at least one, and preferably two, hinged support arms, or plates, 1031. The two hinged support arms 1031 are spaced equidistantly along the long axis of the keyboard support stand 10. Each support arm, or plate, 1031 is typically at least three inches (3") in width, and both (all) support arms 1031 together typically aggregate a length that is a substantial, 36%+, percentage of the overall length of the keyboard support stand 10. Each hinged support arm 1031 engages a selectable channel, or groove, 1024 within the sawtooth, or pawl, surface at the topside surface 1026 of the lower member 102. Each hinged support arm 1031 engages a groove, or channel, 1024 of the sawtooth surface so as to support the upper member 101 at various angles, and degrees of extension, relative to the lower member 102. The particular groove, or channel, or tooth 1024 of the sawtooth surface that is engaged by the hinged support arm 1031 serves to adjust the angle of the upper surface 1010 of the upper member 101 relative to level to be between 0° (level) and 15° in typically six (6) increments. The incremental angles of adjustment are typically 0°, 5°, 9°, 11°35', 13°30' and 15°.

The wrist rest 11 is positioned between the typist (whose wrists 8, 9 are shown in FIGS. 4 and 5) and the keyboard support stand 10, and is and connected to the keyboard support stand 10 by the hinge joint 12. The hinge joint 12 serves as a first, fixed-height, support to the wrist rest 11. The hinge joint 12 is, in turn, supported by the keyboard support stand 10. However, the opposite, front side 111 of the wrist rest 11 is manually adjustable in angle of elevation above an exterior surface 4 (shown in FIG. 3) upon which it rests. By this adjustment the wrists 8, 9 of the typist may be supported at various elevations relative to a keypad surface 51 of the selectively angled keyboard 5 that is supported upon the keyboard support stand 10 (all shown in FIGS. 4 and 5).

The wrist rest 11 has several, typically two (2) eccentric cams 112 that are fixed to a common camshaft 113, and which are collectively manually rotatable in position under force of the fingers against either, or both, of the knurled knobs, or eccentric wing tabs, 114. By selective rotation of the camshaft 113 one of the four sides 1121–1124 of the cams 112 will, at any one time, contact the exterior surface 4 for supporting the wrist rest 11. The two cam sides 1121 and 1122 are located at virtually the same distance from the centerline of camshaft 112. This distance is different than each of the unequal distances between the sides 1123 and 1124 of cams 112 and the centerline of the camshaft 113. Accordingly, dependent upon which of the four sides 1121–1124 of the cams 112 is, at any one time, rotated so as to be positioned downwards and in contact the exterior surface 3, the wrist rest 11 will be positioned at three different elevations, and angles, relative to the hinge 12, and the exterior surface 2.

The upper surface 115 of the wrist rest 11 is deeply padded, and is normally made from dense polyurethane foam. The upper surface 115 is hinged about pivot pins 116 so as to pivot between the illustrated, closed, position and an open position exposing access to cavities 116 within the interior of hollow wrist rest 11. These cavities 116 are sufficient in length to contain an entire standard pencil, and may be used for pencils, pens, paper clips, erasers, rubber bands, or like small items.

The preferred use of the combination keyboard support stand and wrist rest 1 in accordance with the present invention is shown in FIGS. 4–5. The keyboard support stand 10 is typically, conveniently, first manually adjusted in elevation and in angle. The keyboard 5 as supported by the keyboard support stand 10 is desirably positioned at an ergonomically neutral position relative to the angle of the forearm 82, wrist 81 and fingers 83 of the typist's hand 8. Exactly what this means will be illustrated shortly. Then, while the keyboard is supported in the ergonomically neutral position, the wrist 81 of the typist may be conveniently, and at such various times and frequencies as are desired by the typist, also be supported at such various elevations, relative to the upper surface 1010 of the keyboard support stand 10 and the keypad surface 51 of the keyboard 5, as may be from time to time desired by the typist. By this sequence, and these adjustments, the ergonomic neutral position of the typist's forearm 82, wrist 81 and fingers 83 is typically substantially maintained nonetheless that the elevation, and attendant magnitude, of support provided to the typist's wrist 81 is conveniently variable, and varied, in order to reduce fatigue.

A diagrammatic representation of a slight support provided to the wrist of a typical male, or female, typist whose average hand approaches at 25° a keyboard surface elevated at 15° by one particular adjustment of the combination wrist rest and keyboard support stand 1 in accordance with the present invention is shown in FIG. 4. A diagrammatic representation of a considerable support provided to the wrist of the same male or female whose average hand now approaches at 0° the keyboard surface elevated at 0° by another particular adjustment of the combination wrist rest and keyboard support stand 1 is shown in FIG. 5. It is clear that the correct, "straight on" ergometric angle between, on the one part, the forearm 82, wrist 81, and fingers 83 and, on the other part, the keyboard 5, has been preserved in both instances. It is equally clear that a selectively variable degree of support has been provided to the wrist 81.

The angle at which the keyboard is held by the keyboard stand 10, and the magnitude and location of support provided to the typist's wrists by the wrist support 11, are likewise variable to encompass typists ranging in size (and in associated seating) from a (very small) 5th percentile female to a (very large) 95th percentile male.

This wrist support is provided by, and along, the upper surface 115 of wrist rest 11. This upper surface 115 is curved along an imaginary axis substantially parallel to a long axis of the keyboard 5 as such keyboard is supported upon the keyboard support stand 10. The typist's wrist 81 is thus supported along a line of tangential contact between the wrist 81 and the upper surface 115 of the wrist rest 11. A line of contact between the typist's wrist 81 and the upper surface 115 of the wrist rest 11 will be located at a relatively greater, or a relatively lesser, proximity to the keyboard 5 dependent upon whether the keyboard support stand 10 is elevated, respectively, to a relatively higher or a relatively lower position.

This is a very useful feature, It means that an adjustment in elevation of the wrist rest 11 will not only vary the height, and magnitude, of support provided to the wrist 81 of typists' hands 8,9, but will also cause the wrist rest 11 to contact the typists' wrists 81 at various positions of greater or of lessor proximity to the typists' fingers 83 and to the keyboard 5 that is supported by the keyboard support stand 10.

As previously stated, the dense polyurethane foam upper surface 115 of the wrist rest 11 is deeply padded, and is normally made from polyurethane foam. It, and the entire keyboard support stand 10, wrist rest 11, hinge 12, and support cams 112 and camshaft 113 will typically support not only the wrists 81 of the typists' hands 8,9, and all necessary downwards pressures of keystroking against the keyboard surface 51 of keyboard 5, but will, indeed, support the entire two hundred plus pound (200+ lb.) weight of a human in the quite likely event that the combination wrist rest and keyboard support stand 1 is occasionally leaned upon, sat upon, or, more rarely, fallen upon.

Figure 9A:
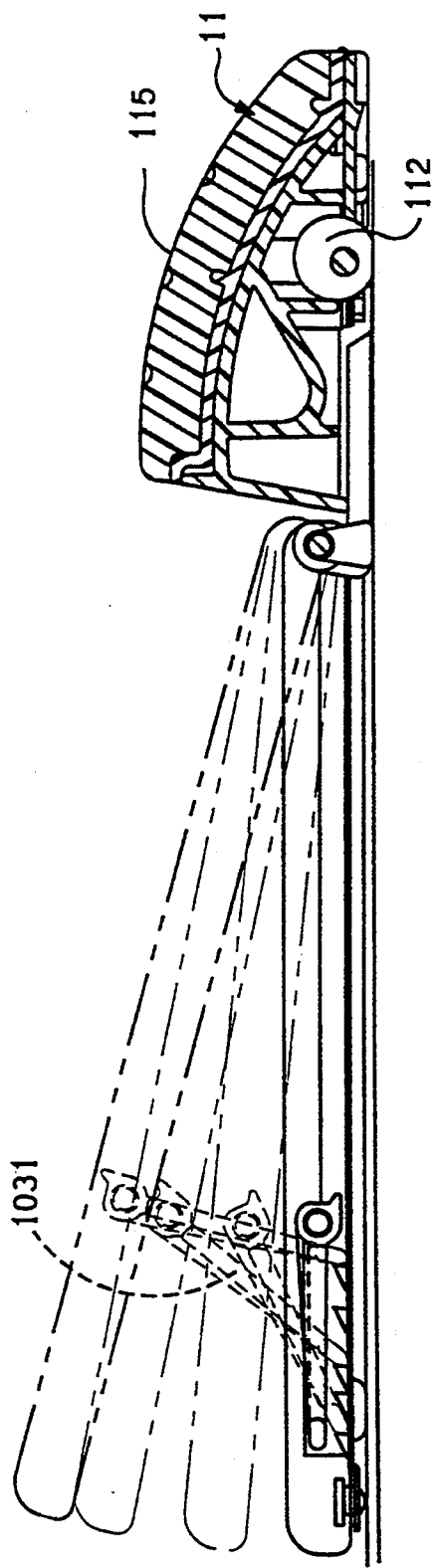
FIG. 9, consisting of FIGS. 9a and 9b, is a side view, partially in cross section, of the manner of adjusting the angle and the elevation of the keyboard support stand of the preferred embodiment of the combination wrist rest and keyboard support stand in accordance with the present invention.
Figure 9B:
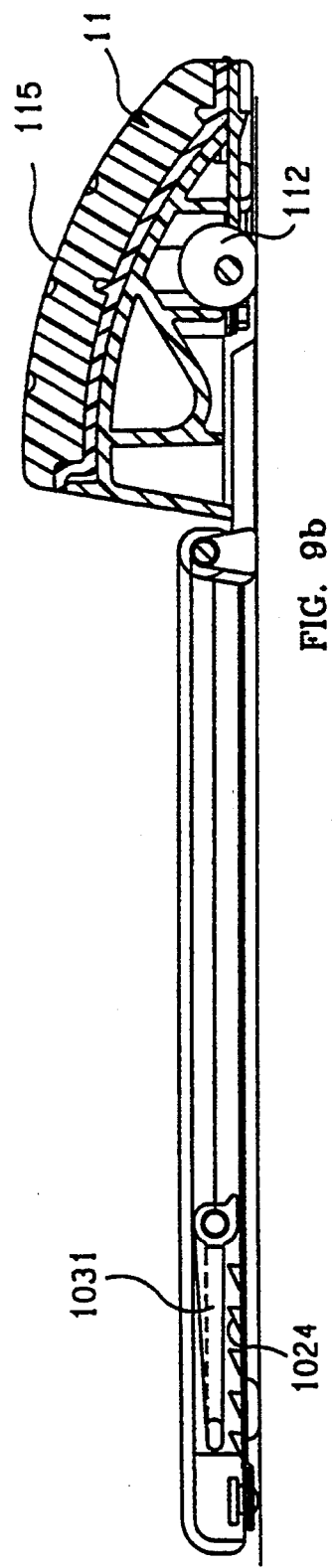

A detail view of the cam, and cam assembly, serving to provide a variable elevation, and angular, support to the wrist rest 11 is shown in FIG. 8 and 9. The cam is adjustable to any of three engaged, and one neutral or unengaged, positions. In the four different cam positions the wrist rest 11 is supported at angles of 0°, 3.2°, 6.4° and 9.6° relative to level. The line of contact between the padded upper surface 115 of the wrist rest 11 and the wrist 81 of the typists' hands 8,9 moves toward the typist as the wrist rest 11 is angled to a greater degree.

The combination wrist rest and keyboard support stand 1 is susceptible of being mated with an optional console 2, one embodiment of which is shown in FIG. 7. The mating is preferably by sliding engagement between "L"-shaped channels on the upper surface of keyboard support member 10 and complimentary edge features on the console 2. The console 2 presents a number of cavities 21-25 suitable to hold paper clips, rubber bands, computer diskettes (typically of both 3½" and 5¼" sizes), computer cassette tape cartridges, audio tapes (typically of cassette, miniature cassette, and micro cassette sizes), stick-on notes and/or other small desk top items. The mating may alternatively be with the keyboard support stand by making the copyholder in the substantial cross section of the letter "L", and by securing the lower leg of the "L"-shaped copyholder to the keyboard stand, normally again by sliding into a complimentary cavity.

The sliding engagement of the (optional) console 2 and the keyboard support member 10 (and through it, the wrist rest 11) permits the console 1 to slide tight against the keyboard 5 (shown in FIGS. 4 and 5) as it rests upon the keyboard stand 10. This engagement minimizes the footprint of the assembled unit, and adds support to the keyboard 5. Moreover, the console 2 ratchets backward and forward slightly in its track, and may thus adjust to best engage the depth and features of a particular keyboard, and to lock such a keyboard in position.

Still further, the combination wrist rest and keyboard support stand 1 is susceptible of being mated with an optional copyholder 3 through, and by, its optional console 2, as is also shown in FIG. 2. The mating is again preferably by a sliding engagement, this time between the optional copyholder 3 and the optional console 2. A top plan view of the combination wrist rest and keyboard support stand 1 with its optional console 2 and its optional copyholder 3 both attached is shown in FIG. 7.

In accordance with the preceding discussion, alternative manners of implementing the support structures, and principles, of the present invention will suggest themselves to a practitioner of the mechanical arts. For example, either, or both, the keyboard support member and/or the wrist rest could, alternatively, be supported on cantilevers from an external frame. The keyboard support member and wrist support need not even be hinged together if an external frame were to preserves positional alignments, and independent adjustability.

For example, the optional copyholder could be attached directly to the keyboard stand, and without necessity of an optional console.

For example, the console, or a console modified for better attachment to the underside of a keyboard, might be used alone with a keyboard, or in combination with only an adjustable keyboard stand without an accompanying wrist rest. Such a configuration without a wrist rest would, or course, defeat some (but not all) of the ergonomic purposes of the present invention. (In general, all assemblies of the present invention are preferably made to fit together reliably, strongly, and well while still retaining the capacity to be non-destructively disassembled. According to this capacity, a typist who simply does not want, or grows tired, of some portion or portions of the entire unit may sometimes discard the unwanted portions while still retaining other portions in functional usage.)

In accordance with these and other possible adaptations and variations of the present invention, the invention should be in interpreted broadly, and in accordance with the following claims only, and not solely in accordance with that particular embodiment within which the invention has been taught.

What is claimed is:

1. A combination wrist rest and keyboard support stand for supporting both a typist's wrist and a keyboard above a surface, the stand comprising:
   a wrist-rest member for supporting a typist's wrist;
   a manually adjustable first variable support for supporting the wrist-rest member at a variable elevation above the surface; and
   a keyboard-support member for supporting a keyboard;
   a second variable support, manually adjustable independently of the first variable support, for supporting the keyboard-support member at a variable angle relative to the surface; and
   a hinge, positionally located between, on the one hand, the wrist-rest member and the first variable support, and, on the other hand, the keyboard-support member and the second variable support, for pivotally connecting, as first elements, the wrist-rest member and the first variable support to, as second elements, the keyboard-support member and the second variable support, the pivotal connection being so that the wrist-rest member is pivotable relative to an unchanging stationary keyboard-support member during a course of the wrist-rest member's variable adjustment in elevation above the surface by action of the first variable support, and so that, equivalently and conversely, the keyboard-support member is pivotable relative to an unchanging stationary wrist-rest member during a course of the keyboard-support member's adjustment in angle relative to the surface by action of the second variable support;
   wherein the typist's wrist that is supported upon the wrist-rest member is variably positionable in elevation relative to the surface independently of the keyboard-support member's adjustment in angle relative to the same surface;
   wherein the keyboard that is supported upon the keyboard-support member is variably positionable in angle relative to the surface independently of the wrist-rest member's adjustment in elevation relative to the same surface;
   wherein the typist's wrist that rests upon the wrist-rest member is variably positionable both in elevation and in angle relative to the keyboard that rests upon the keyboard-rest member, and vice versa.

2. The combination wrist rest and keyboard support stand according to claim 1 wherein the wrist-rest member has and defines:
   an upper surface curved along an imaginary axis substantially parallel to a long axis of the keyboard as such keyboard is supported upon the keyboard-support member;
   wherein the typist's wrist is supported along a line of tangential contact between the wrist and the upper surface of the wrist-rest member.

3. The combination wrist rest and keyboard support stand according to claim 2
   wherein the line of contact of the typist's wrist with the upper surface of the wrist-rest member is located in relatively greater, or relatively lesser, proximity to the keyboard dependent upon whether the keyboard-support member is angled, respectively, to a relatively higher or a relatively lower angle of adjustment;
   wherein the adjustment in elevation of the wrist-rest member serves to cause it to contact the typist's wrist at various positions of greater, or of lessor, proximity to the typist's fingers and to the keyboard that is supported by the keyboard-support member.

4. The combination wrist rest and keyboard support stand according to claim 1 wherein the wrist-rest member has and defines:
   an interior cavity for holding objects.

5. The combination wrist rest and keyboard support stand according to claim 4
   wherein the wrist-rest's cavity is sufficiently large so as to hold a pencil.

6. The combination wrist rest and keyboard support stand according to claim 4 wherein the wrist-rest member comprises:
   a first hinge joint; and
   a cover, having and defining an upper surface for supporting the typist's wrist, for pivoting about the first hinge joint in order to provide access to the interior cavity.

7. The combination wrist rest and keyboard support stand according to claim 1 wherein the manually-adjustable first variable support comprises:
   a second pivot joint;
   an asymmetrical member, eccentrically mounted to the second pivot joint, for pivoting about the second pivot joint in order to support the wrist-rest member at the variable elevation above the surface.

8. The combination wrist rest and keyboard support stand according to claim 1 wherein the keyboard-support member comprises:
   a first substantially planar elongate member having and presenting an upper surface suitable to support the keyboard;
   a second substantially planar elongate member for resting level upon the surface;
   wherein a one of the first and the second members has and defines, on its surface that is directionally disposed towards the other one of the first and second members, a plurality of features aligned along its elongate axis, any one of which features is suitable to engage an end of an abutting strut;
   wherein the hinge pivotally connects the second planar member to the first planar member as well as the wrist-rest member to the keyboard-support member; and wherein the second variable support comprises:
   a pivot joint located upon a remaining one of the first and the second members; and
   a strut pivotally connected to the pivot joint and manually moveable in position so as to, by an abutting engagement of its end with a selected one of the plurality of features, hold the first and the second members at a selectable predetermined angle of separation, one relative to the other.

9. The combination wrist rest and keyboard support stand according to claim 8 wherein the plurality of features of the one of the first and second members comprise:
   a plurality of parallel grooves.

10. The combination wrist rest and keyboard support according to claim 1 further comprising:
   a console, attachable to the keyboard support member at a position oppositely from its hinged attachment to the wrist rest, having and defining cavities for containing and holding small objects without interference to the support functions of both the wrist rest and keyboard support member, and without interference to the typist's use of his/her wrist and fingers in typing upon the supported keyboard.

11. The combination wrist rest and keyboard support according to claim 10 further comprising:
   a copyholder, attachable to the console oppositely from its attachment to the keyboard support member, for holding a paper copy at a position visible to a typist whose wrist is supported upon the wrist rest.

12. A combination wrist rest, keyboard support, and pencil box apparatus for use on a level support surface, the apparatus comprising:
   an adjustable wrist rest, resting on the support surface and having and defining an interior cavity for holding pencils, for supporting a typist's wrist above the support surface, the adjustable wrist rest including
      a padded member upon which the typist's wrist is supported, and
      means for adjusting the padded member in elevation relative to the support surface upon which it rests and relative to the wrist rest to which it connects;
   an adjustable keyboard support member, resting on the support surface and connected to the wrist rest, for supporting a keyboard above the support surface, the adjustable keyboard support member including
      a planar member upon which the keyboard is supported, and
      means for adjusting the planar member in angle relative to the level support surface; and
   a connection means for movably connecting the wrist rest to the keyboard support member, the connection means including
      a hinge pivotally connecting the rest to the keyboard support member;
   wherein the typist may rest his/her wrist upon the wrist rest while keystroking the keyboard supported upon the keyboard support member.

13. The combination wrist rest, keyboard support, and pencil box apparatus according to claim 12 further comprising:
   a console, attachable to the keyboard support member oppositely to its moveable connection to the wrist rest, for holding small objects; and
   a means for attaching the console to the keyboard support member;
   wherein the apparatus is a combination wrist rest, keyboard support, pencil box and small object holder.

14. The combination wrist rest, keyboard support, and pencil box apparatus according to claim 13 wherein the means for attaching the console to the keyboard support member comprises:
   a tracked slide.

15. The combination wrist rest, keyboard support, pencil box and small object holder apparatus according to claim 13 further comprising:
   a copyholder, attachable to the console oppositely to its attachment to the keyboard support member, for holding a paper copy; and
   means for attaching the copyholder to the console;
   wherein the apparatus is a combination wrist rest, keyboard support, pencil box, small object holder and copyholder.

16. An ergonomically correct, manually adjustable, and, from time to time, manually variable, wrist rest for supporting a typist's wrist relative to a keyboard in order to minimize carpal tunnel syndrome, the wrist rest comprising:
   an angularly adjustable keyboard support means, manually selectively adjustable in angle relative to an exterior surface upon which it rests, for supporting a base of a keyboard at various small acute angles relative to level; and
   a wrist rest, positioned towards the typist from and connected to the keyboard support member, manually adjustable in elevation above the exterior surface upon which it rests for supporting the typist's wrist at various elevations relative to the selectively angled keyboard, the wrist rest having
   an eccentric cam manually rotatable in position under force of the fingers for conveniently manually adjusting the keyboard in elevation;
   wherein the keyboard may be supported by the keyboard support member at an ergonomically neutral position relative to the angle of the typist's forearm, wrist and fingers;
   wherein, one the keyboard is supported in the ergonomically neutral position, the wrist may be conveniently, and at various times and frequencies desired by the typist, supported at various elevations also desired by the typist relative to the surface, and to the keyboard;
   wherein the ergonomic neutral position of the typist's forearm, wrist and fingers is substantially maintained nonetheless that the elevation, and attendant magnitude, of support provided to the typist's wrist is conveniently variable to reduce fatigue.

* * * * *